United States Patent
Patka et al.

(10) Patent No.: US 11,902,169 B2
(45) Date of Patent: Feb. 13, 2024

(54) LATENCY EVALUATION AND MANAGEMENT RESOLUTION

(71) Applicant: Verizon Patent and Licensing Inc., Basking Ridge, NJ (US)

(72) Inventors: Andrew F. Patka, Holliston, MA (US); Yann Sendra, McLean, VA (US); Arun Cherla, Somerset, NJ (US); Charles Andrew Beltran, Parsippany, NJ (US); Ronald Carloni, Bloomfield, NJ (US); John F. Moore, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 219 days.

(21) Appl. No.: 17/381,692

(22) Filed: Jul. 21, 2021

(65) Prior Publication Data

US 2023/0021461 A1    Jan. 26, 2023

(51) Int. Cl.
*H04L 47/283*    (2022.01)
*H04L 43/0894*    (2022.01)
*H04W 28/02*    (2009.01)

(52) U.S. Cl.
CPC ........ *H04L 47/283* (2013.01); *H04L 43/0894* (2013.01); *H04W 28/0289* (2013.01)

(58) Field of Classification Search
CPC ............. H04L 47/283; H04L 43/0894; H04W 28/0289
See application file for complete search history.

(56) References Cited

U.S. PATENT DOCUMENTS

| | | | | |
|---|---|---|---|---|
| 9,276,873 | B2* | 3/2016 | Kakadia | H04L 47/805 |
| 9,455,921 | B2* | 9/2016 | Kakadia | H04L 47/2483 |
| 2017/0353874 | A1* | 12/2017 | Harrang | H04L 43/0864 |
| 2019/0028934 | A1* | 1/2019 | Rasanen | H04W 36/0027 |
| 2022/0021596 | A1* | 1/2022 | Li | H04W 24/08 |
| 2022/0394076 | A1* | 12/2022 | Willars | H04L 65/75 |
| 2023/0089409 | A1* | 3/2023 | Woo | H04B 7/0404 |
| | | | | 455/73 |

FOREIGN PATENT DOCUMENTS

WO    WO-2020239195 A1 *    12/2020    ......... H04L 41/5051

* cited by examiner

*Primary Examiner* — Chi H Pham
*Assistant Examiner* — Weibin Huang

(57) ABSTRACT

One or more computing devices, systems, and/or methods for latency evaluation and management resolution are provided. A fingerprint for traffic flow over a communication network from an application executing on a device to a multi-access edge (MEC) server instance hosted by a MEC platform may be identified. The fingerprint may be used to track the traffic flow between the application and the MEC server in order to measure round trip time latencies of the traffic flow. In response to a round trip time latency violating a latency management policy, segment latencies along segments of a communication travel path of the traffic flow from the device to the MEC platform may be measured. A management resolution function may be performed based upon one or more of the segment latencies exceeding a threshold.

20 Claims, 11 Drawing Sheets

LATENCY EVALUATION AND MANAGEMENT RESOLUTION

BACKGROUND

Many types of applications may execute on devices, such as user equipment, that connect over a communication network. Some of these applications may exchange information over the communication network with multi-access edge (MEC) server instances hosted on MEC platforms. In order for these applications to operate correctly, the applications may have certain latency requirements with respect to the time it takes for an application to transmit information to the MEC server instance over the communication network and receive a response from the MEC server instance over the communication network. Many of these applications may not work correctly or at all if latency over the communication network violates these latency requirements.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
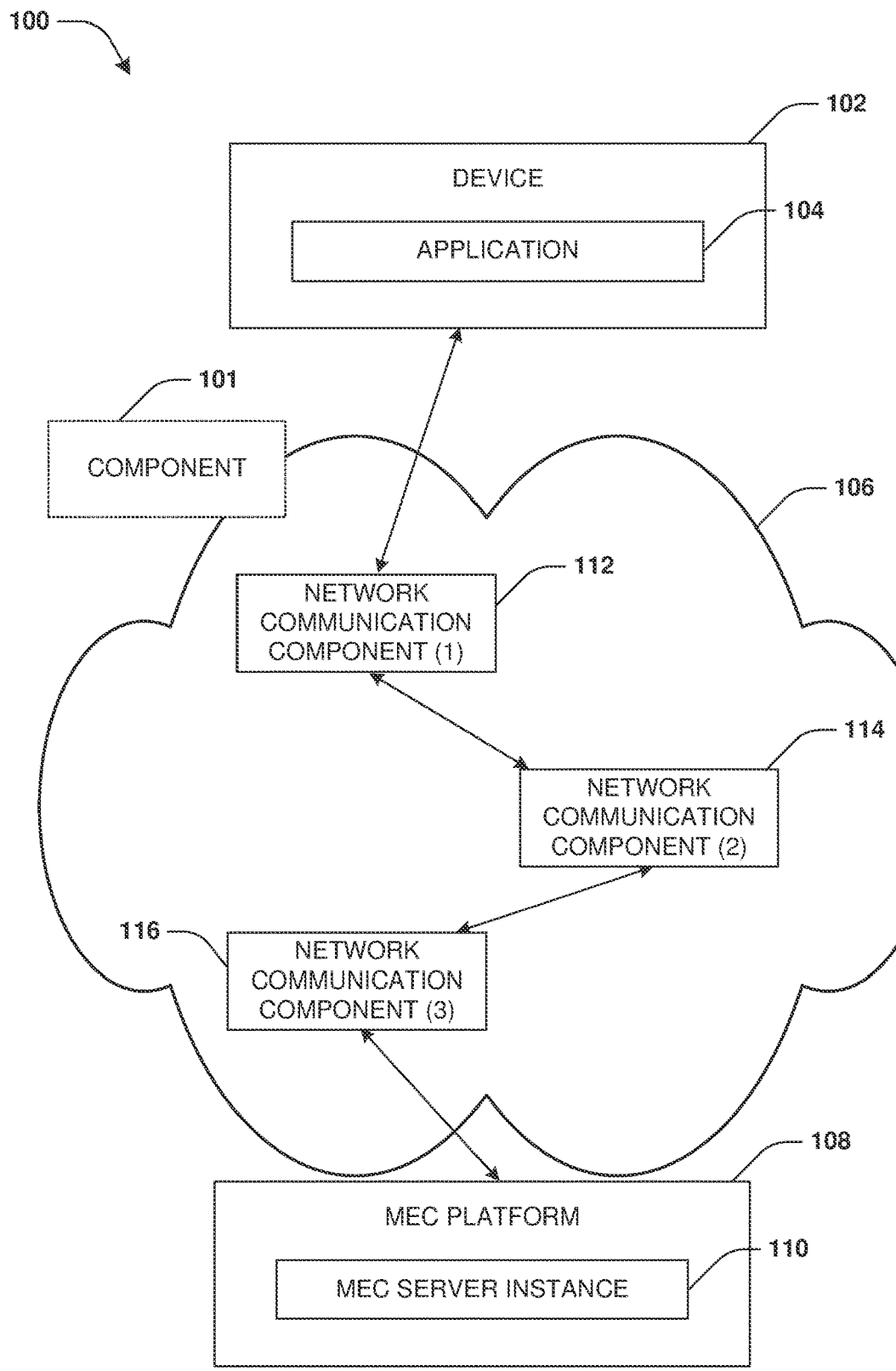
FIG. 1 is a diagram illustrating an example scenario for latency evaluation and management resolution.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for latency evaluation and management resolution are provided. Many applications that are hosted on client devices such as user equipment may provide functionality that involves compute-intensive processing. Instead of burdening the client devices with such compute-intensive processing, these application may offload the processing to multi-access edge (MEC) server instances hosted on MEC platforms. A MEC server instance may be more capable of performing compute-intensive processing, and thus offloading these operations from the client devices helps optimize resource utilization and storage consumption of the client devices. A MEC platform hosting the MEC server instance may be located within a relatively close proximity to a client device, such as being accessible through a radio access network (RAN). This enables the ability for the MEC server instance to provide low or ultralow latency for applications, such as where a real-time or near-real-time response is required in order for the applications to operate correctly or at all. For example, driverless vehicles, augmented reality, machine vision, robotics (e.g., control of a robot arm), facial recognition, immerse media, and/or a variety of other types of applications may require such low latency.

Unfortunately, not every communication network and/or communication network component is capable of meeting such latency requirements of these applications. Furthermore, certain conditions such as degraded performance, bottlenecks, and/or overburdened communication network components may adversely affect latency. This can cause these applications to malfunction. Conventional techniques for troubleshooting and/or identifying latency issues that would adversely affect operation of applications are unable to provide automated policy driven near-real-time proactive and/or reactive identification and resolution of latency issues. For example, if an application is not operating correctly, a user could submit a troubleshooting request that may result in a manual troubleshooting process that could take days to weeks. This troubleshooting process may not be able to identify the cause of the issue because there could be too much network communication records for any human to be able to parse in order to identify causes of latency increases resulting in the application not operating correctly.

Accordingly, near-real-time proactive and reactive management of applications and MEC server instances is provided in order to identify applications that are impacted by variations in round trip network latency between client devices and MEC platforms. In this way, various management resolution functions may be performed to quickly resolve the latency issues such as in near-real-time during which the latency issues occur. The techniques provided herein may be implemented by a component hosted at a client device, at a device separate from the client device such as at a server or at a communication network component of the communication network, at a MEC device hosting a MEC platform, or anywhere else.

In some embodiments, the component may implement a user equipment traffic injector configured to transmit synthetic traffic from a device (a client device) hosting an application to a MEC platform hosting a MEC server instance. For example, the synthetic traffic may correspond to control packets, such as Internet control message protocol (ICMP) echo requests. In an example, the user equipment traffic injector may be hosted by the device. The component may implement a MEC reflector at the MEC platform. The MEC reflector may be configured to respond to the control packets, such as with ICMP responses. The timing of when ICMP echo requests are sent and when ICMP responses are received may be used to measure end to end round trip times between the device and the MEC platform.

In some embodiments, the component may implement functionality to measure and collect end to end latency of active IP flows. For example, time stamped end to end round trip latency measurements may be obtained for a set of IP flows between the client device and the MEC platform, along with a list of IP flows that are active between the client device and the MEC platform at that time. Each IP flow is defined by a tuple corresponding to a client device IP address, a MEC server instance IP address, a source port number, and a destination port number. The port numbers may be captured for user data protocol (UDP) and/or transmission control protocol (TCP) transport layer traffic.

In some embodiments, the component may implement MEC application onboarding functionality and/or may implement an application data store. The component may obtain and store application latency profiles for each MEC application, such as prior to the first execution of the MEC applications. Each MEC application latency profile may comprise an application identifier, a set of transport layer port numbers that the application client and server can use in corresponding IP flows, and/or one or more latency management policies that apply to that MEC application.

In some embodiments, the component may implement an end to end latency detection trigger function that obtains MEC application latency profiles from the application data store. For each active IP flow, a latency management policy is applied to determine whether latency segmentation should be performed for that active IP flow. Latency segmentation may correspond to identifying segments of the active IP flows and measuring segment latencies of the segments in order to identify any segments with segment latencies exceeding a threshold.

In some embodiments, the component may implement a network topology data store. The network topology data store may comprise identifiers of a set of IP forwarding network elements (network communication components) and associated physical interfaces that are used to forward IP traffic between a set of client devices and MEC platforms within a specific geography.

In some embodiments, the component may implement a network topology dynamic digital twin constructor function. This function may be implemented for an IP flow that is active between the client device and the MEC platform at a point in time. This function queries the routing tables of each IP forwarder (e.g., IP forwarders of network communication components) to identify IP segments and physical interfaces used to carry the associated IP traffic. The representation of these IP segments and physical interfaces is a dynamic digital twin of the IP flow at a point in time. In some embodiments, a digital plane may be composed of data representing the dynamic digital twin, and may be evaluated to identify IP segments of communication travel paths of IP flows.

In some embodiments, the component may implement a set of per-segment latency measurement functions. This set of functions continuously measure latencies across a physical layer transport between interfaces of IP forwarders. In this way, latency segmentation may be performed in order to obtain segment latencies of segments.

In some embodiments, the component may implement an application latency correlation function for a point in time. This function correlates the end to end round trip time latency between a pair of client device and MEC server IP endpoints with segment latencies of the network segments over which IP traffic was carried at that time, and the set of applications that had active IP flows between those IP endpoints at that time.

This component is configured to automatically time-correlate the end to end ICMP round trip time latency between a pair of client device and MEC endpoints with the applications that have active IP flows between those endpoints, along with the latencies over each of the physical layer segments along the common path of those end to end IP flows. This capability enables near-real-time proactive and reactive management of MEC applications that are executing between client devices (user equipment) and MEC server instances. Proactive management includes the ability to detect latency conditions that can adversely impact such applications and mitigate these latency conditions before their occurrence. In an example of proactive mitigation, a new instance of a MEC application server may be automatically created on additional MEC physical servers at optimal MEC sites by invoking a 3GPP edge discovery service and by steering new application client instances to those servers. In another example of proactive mitigation, latency update notifications may be automatically sent to applications that can apply application specific polices to manage the latency changes (e.g., throttling). In an example of reactive mitigation, latency diagnostics may be executed in near-real-time in order to determine if application implemented fixes and/or network fixes have solved latency problems that were identified.

In this way, MEC application latency policies may be applied to identify, in near-real-time, the MEC applications that are or would be impacted by network latency variations and to determine per-segment latency contributions of the overall end to end latency experienced by a MEC application. In this way, an appropriate management resolution function can be implemented to resolve any latency issues otherwise affecting performance of the MEC applications.

FIG. 1 illustrates an example environment within which a component 101 configured for latency evaluation and management resolution may be implemented. The component 101 may be hosted at a device 102 hosting an application (e.g., user equipment hosting a MEC application), at a MEC platform 108 hosting a MEC server instance 110, or at any other device capable of connecting to a communication network 106 over which the device 102 and the MEC platform 108 communicate. The component 101 may be configured to proactively and/or reactively identify and resolve latency issues with respect to traffic flow (IP flow) between the device 102 and the MEC platform 108 such as between the application 104 and the MEC server instance 110 over the communication network 106.

In an example, data packets of the traffic flow may travel along segments between network communication components of the communication network. For example the segments may comprise a radio segment between the device 102 and a first network communication component 112 (e.g., a cell site), a cell to hub segment between the first network communication component 112 and a second network communication component 114 (e.g., a hub), a hub to SAP segment between the second network communication component 114 and a third network communication component 116 (e.g., a SAP), and a SAP to MEC segment between the third network communication component 116 and the MEC platform 108.

As will be described in further detail, the component 101 may determine, in near-real-time during communication between the application 104 and the MEC server instance 110, whether a latency management policy of the application 104 has been or will be violated. For example, the latency management policy may specify that the application 104 requires a 20 ms round trip time latency or less, but there is now a 40 ms round trip time latency. Accordingly, the component 101 in near-real-time may identify segment latencies along the segments in order to identify any segments and/or network communication components causing latency issues (e.g., increased latency, latencies larger than normal or expected, latencies greater than latencies of other segments, a latency greater than a threshold value, etc.). In this way, the component in near-real-time may implement one or more management resolution functions in order to resolve the violation of the latency management policy.

Figure 2:
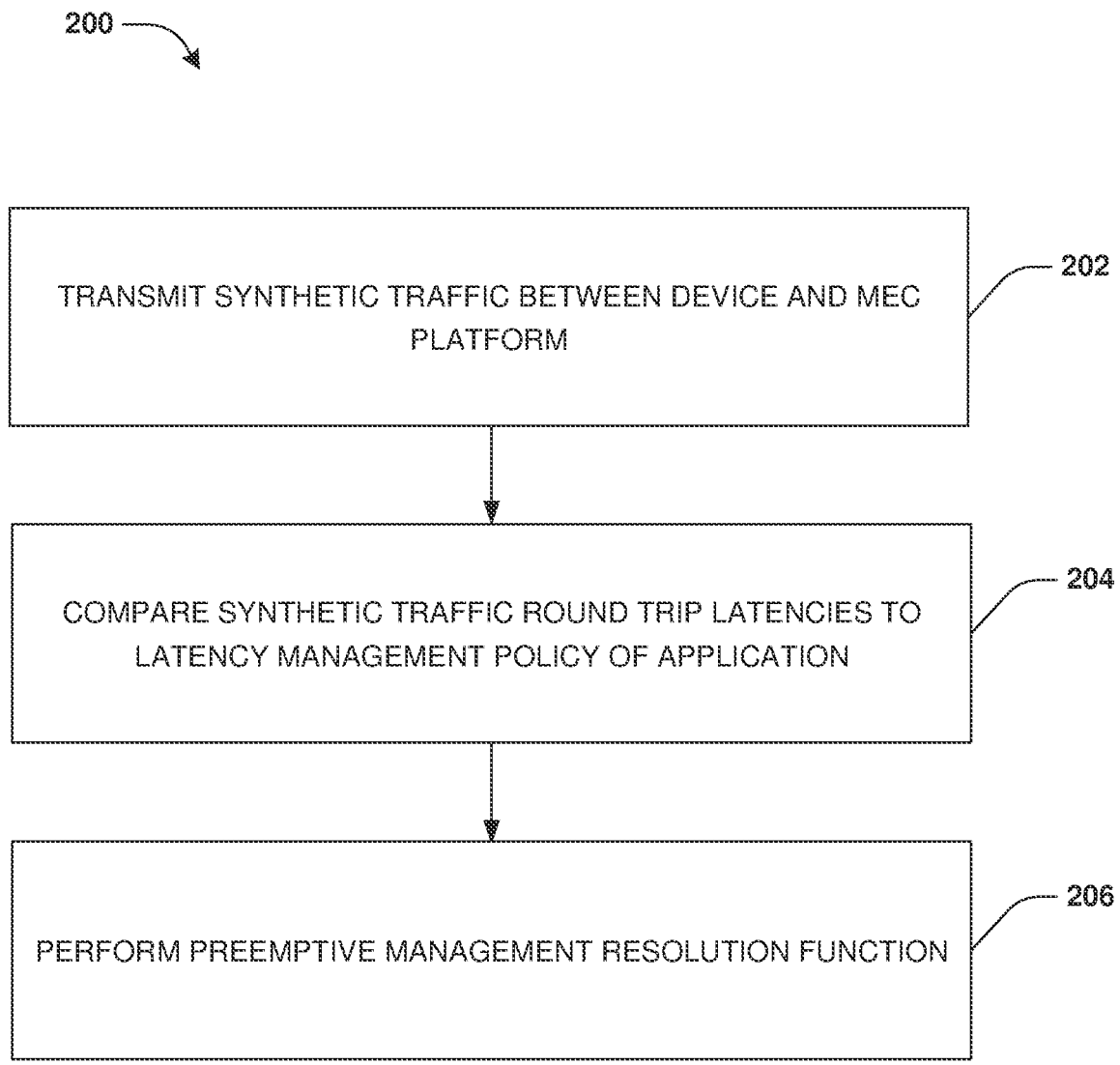
FIG. 2 is a flow chart illustrating an example method for latency evaluation and management resolution, where proactive latency evaluation is performed.
Figure 3:
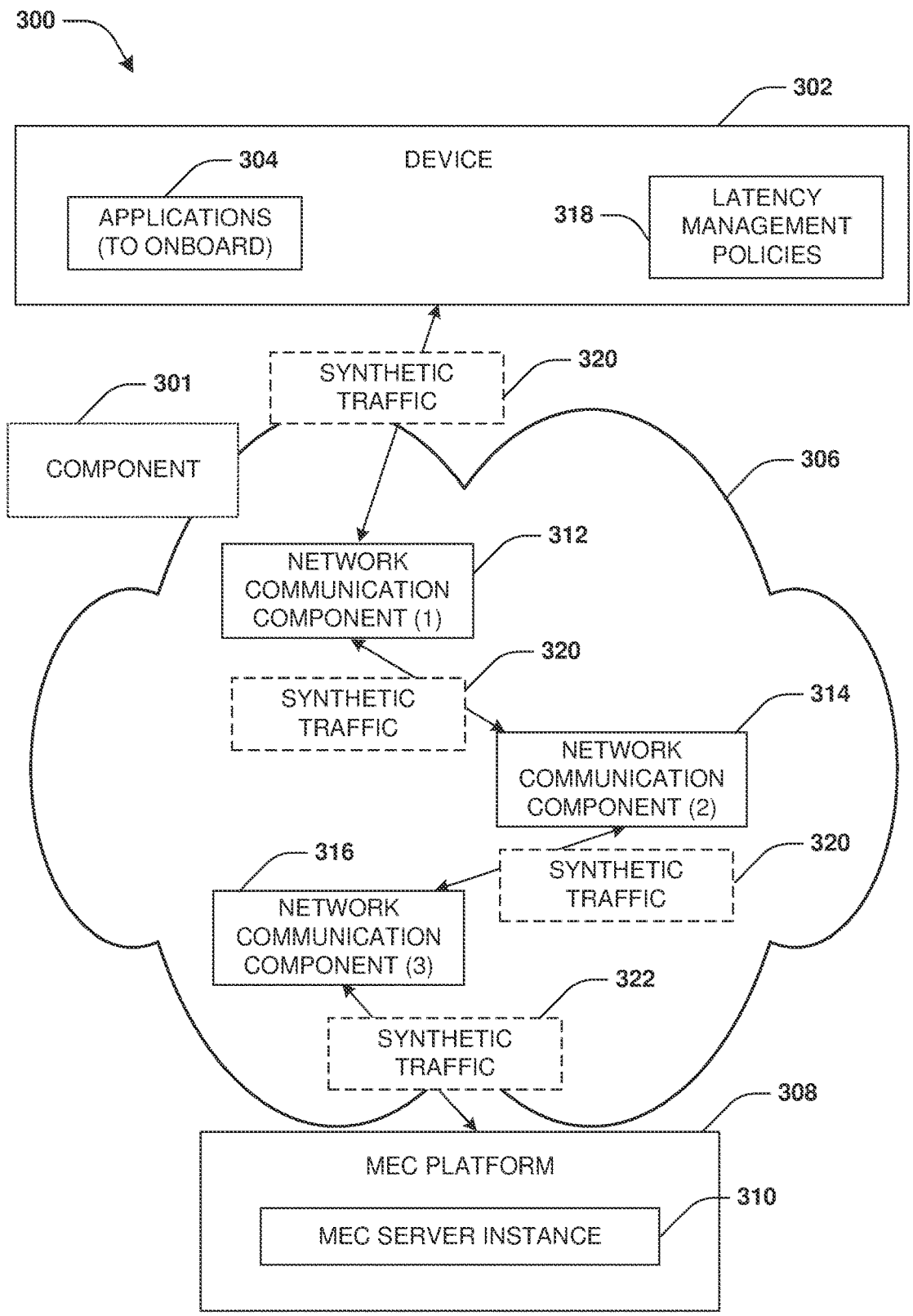
FIG. 3 is a diagram illustrating an example scenario for latency evaluation and management resolution, where proactive latency evaluation is performed.

An embodiment of latency evaluation and management resolution is illustrated by an exemplary method 200 of FIG. 2, which is further described in conjunction with system 300 of FIG. 3. A device 302 such as user equipment (e.g., a cellular phone, a smart watch, a vehicle computer, hardware and/or software associated with equipment such as manufacturing equipment, etc.) may be configured to onboard and host applications 304. These applications 304 may be configured to communicate over a communication network 306 with MEC server instances hosted by MEC platforms, such as a MEC server instance 310 hosted by a MEC platform 308. In an example, an application may be configured to control a vehicle while in an autonomous driving mode. In another example, an application may control a robot arm within a manufacturing plant. In yet another example, the application may perform facial recognition in order to determine whether to unlock a door to a building. It may be appreciated that a variety of different types of applications may be hosted by the device 302. These applications 304 may be associated with latency management policies 318. A latency management policy for an application may specify latency thresholds and/or requirements of the application (e.g., latency is to be below 20 ms, latency cannot exceed 20 ms for more than 1 second, etc.).

A component 301 may be configured to perform latency evaluation and management resolution. The component 301 may be hosted by the device 302, by the MEC platform 308, or by another device connected to the communication network 306. The component 301 may be configured to perform preemptive identification and resolution of latency issues that may affect the applications 304 during runtime after the applications 304 have been onboarded. Accordingly, during operation 202 of method 200, the component 301 may transmit synthetic traffic 320 between the device 302 and the MEC platform 308 over the communication network 306 in order to measure synthetic traffic round trip time latencies.

In some embodiments, the component 301, which may be executing on the device 302, may transmit control packets from a software stack of the device 302 over the communication network 306 as the synthetic traffic 320. The control packets may be transmitted over the communication network 306 to a reflector component hosted by the MEC platform 308. The reflector component may transmit back responses to the control packets. In this way, synthetic traffic round trip time latencies may be measured based upon the round trip times of the control packets and responses.

In some embodiments, the component 301 may implement a user equipment traffic injector configured to transmit the synthetic traffic 320 from the device 302 to the MEC platform 308 hosting the MEC server instance 310. For example, the synthetic traffic 320 may correspond to control packets, such as Internet control message protocol (ICMP) echo requests. In an example, the user equipment traffic injector may be hosted by the device 302. The component 301 may implement a MEC reflector configured to respond to the control packets, such as with ICMP responses. The timing of when ICMP echo requests are sent and when ICMP responses are received may be used to measure end to end round trip times between the device 302 and the MEC platform 310 as synthetic traffic round trip time latencies. In some embodiments, the synthetic traffic 320 does not comprise application data, but is used as a lightweight pinging mechanism. In some embodiments, the measurement of the synthetic traffic round trip time latencies are performed before the applications 304 are onboarded and executing on the device 302 in order to perform proactive monitoring.

The synthetic traffic 320 may travel along segments between network communication components of the communication network 306. For example, the synthetic traffic 320 may travel along segments between the device 302, a first network communication component 312, a second network communication component 314, a third network communication component 316, and the MEC platform 308.

During operation 204 of method 200, the synthetic traffic round trip time latencies may be compared to the latency management policies 318 of the applications 304 that are to be onboarded for execution on the device 302 for accessing the MEC server instance 310. A determination may be made as to whether one or more of the synthetic traffic round trip time latencies would violate any of the latency management policies 318. In an example, a synthetic traffic round trip latency of 30 ms may violate a requirement that an application is to experience at most 20 ms of latency. In another example, the synthetic traffic round trip time latencies may indicate that there was a spike in latency from 10 ms to 40 ms for 2 seconds, which may not violate a requirement that an application is to experience no more than 8 ms of latency over a 3 second duration. In this way, the synthetic traffic round trip time latencies may be compared to various latency and time thresholds and requirements.

During operation 206 of method 200, in response to a determination that one or more synthetic traffic round trip time latencies would violate a latency management policy of an application, a preemptive management resolution function may be performed. In some embodiments, the preemptive management resolution function may be performed to configure or notify the application during onboarding that an expected latency may violate the latency management policy, and thus the application may perform preemptive configuration actions such as throttling the application. In some embodiments, the preemptive management resolution function may be performed to create a new MEC server instance on the MEC platform 308 or on a different MEC platform (e.g., a more performant MEC platform or a MEC platform located along a network path having a faster round trip time) in order to reduce latency. In some embodiments, the preemptive management resolution function may be performed to migrate/move the MEC server instance 310 to a different MEC platform. It may be appreciated that a variety of preemptive management resolution functions may be performed.

In some embodiments, the component 301 may utilize the synthetic traffic 320 during runtime of the applications 304 in order to track synthetic traffic round trip time latencies. These synthetic traffic round trip time latencies may be compared to the latency management policies 318 of the applications 304 in order to identify any potential latency issues that the applications 304 may experience during runtime. In some embodiments, the preemptive identification and resolution of latency issues may be performed in conjunction with reactive identification and resolution of latency issues, which is described in relation to FIGS. 4, 5A, and 5B.

Figure 4:
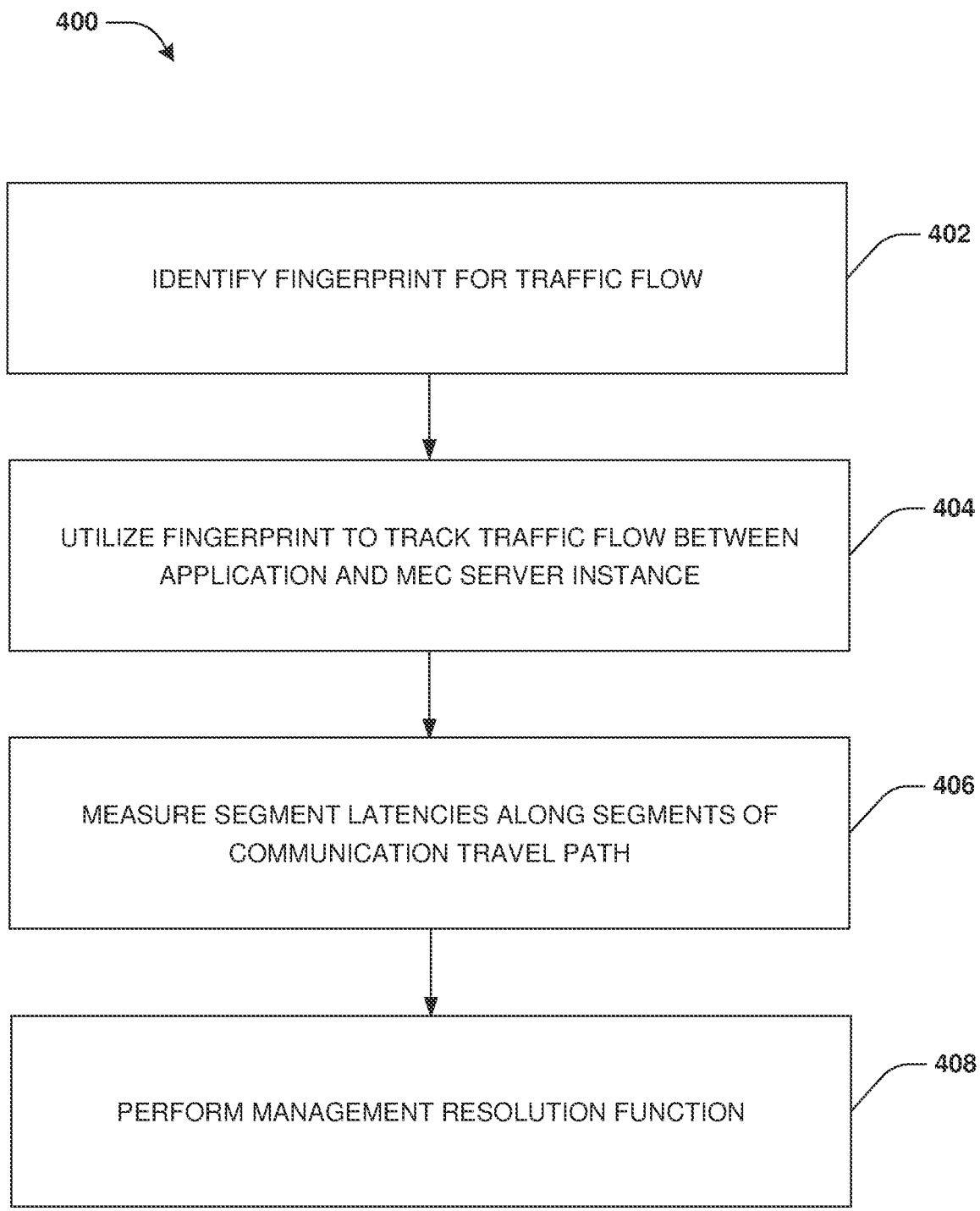
FIG. 4 is a flow chart illustrating an example method for latency evaluation and management resolution, where reactive latency evaluation is performed.
Figure 5A:
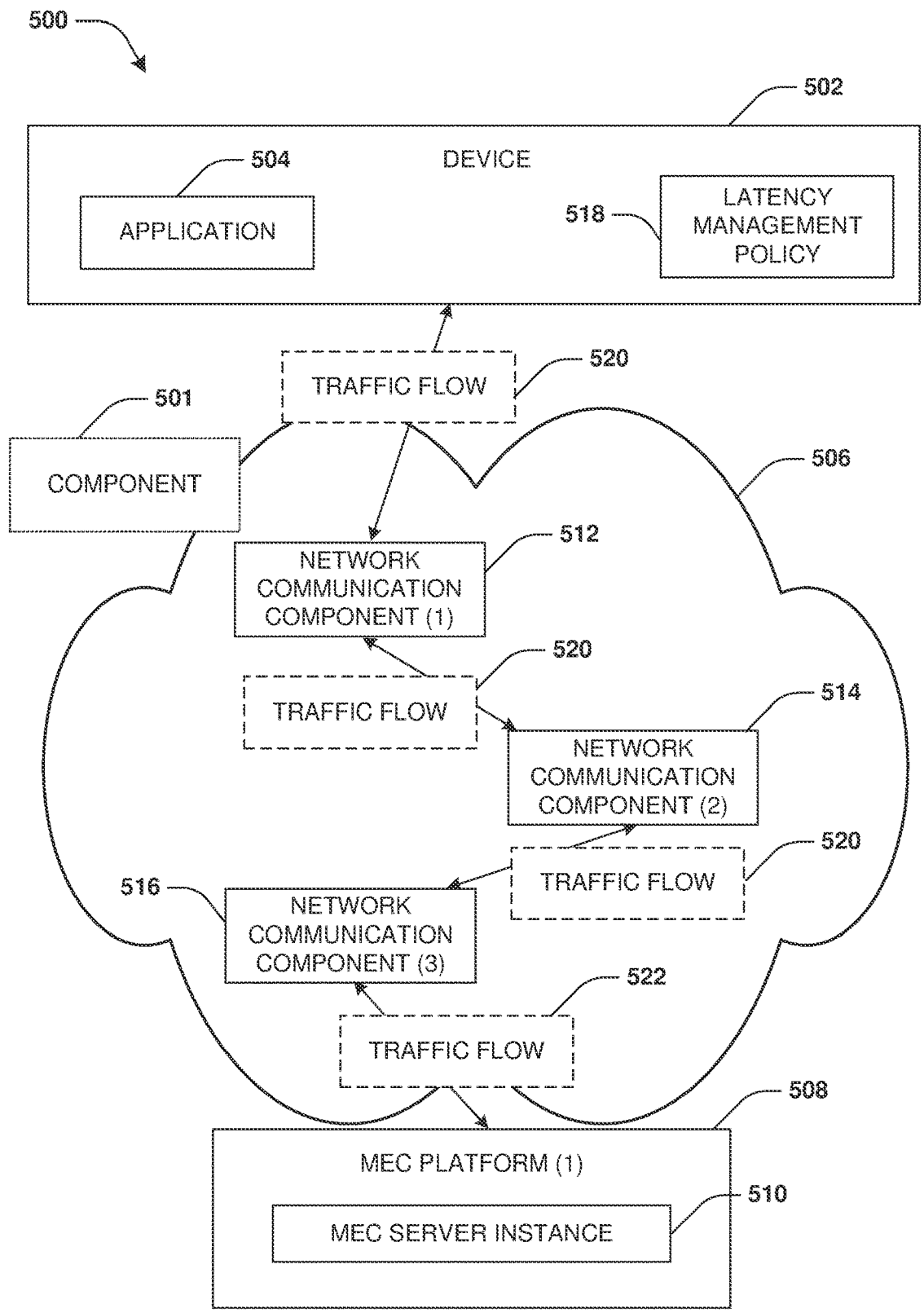
FIG. 5A is a diagram illustrating an example scenario for latency evaluation and management resolution, where reactive latency evaluation is performed.
Figure 5B:
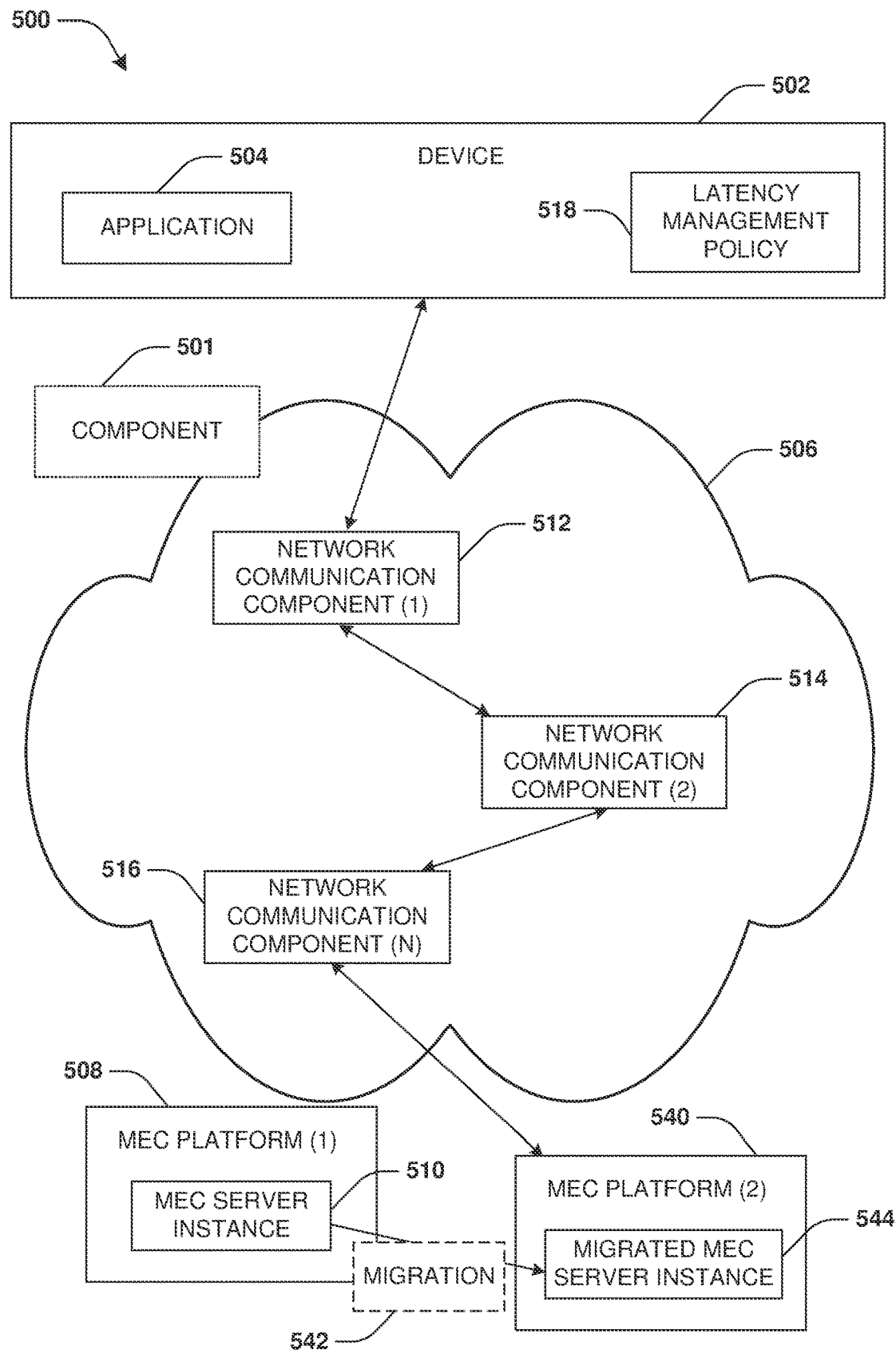
FIG. 5B is a diagram illustrating an example scenario for latency evaluation and management resolution, where a management resolution is performed.

An embodiment of latency evaluation and management resolution is illustrated by an exemplary method 400 of FIG. 4, which is further described in conjunction with system 500 of FIGS. 5A and 5B. A device 502 may execute one or more applications, such as an application 504. The application 504 may be configured to communicate over a communication network 506 with a MEC server instance 510 hosted by a first MEC platform 508. In an example, the application 504 may be associated with a latency management policy 518. The latency management policy 518 for the application 504 may specify one or more latency thresholds and/or requirements of the application 504 (e.g., latency is to be below 50 ms, latency cannot exceed 50 ms for more than 1 second, etc.).

A component 501 may be configured to perform latency evaluation and management resolution. The component 501 may be hosted by the device 502, by the first MEC platform 508, or by another device connected to the communication network 506. The component 501 may be configured to perform reactive identification and/or resolution of latency issues that may affect the application 504 during runtime. Accordingly, the component 501 may identify a traffic flow 520 of data packets exchanged over the communication network 506 between the application 504 and the MEC server instance 510 on the first MEC platform 508.

During operation 402 of method 400, the component 501 may identify a fingerprint for the traffic flow 520 over the communication network 506 between the application 504 and the MEC server instance 510. The fingerprint may be used to identify individual data packets that belong to the traffic flow 520 between the application 504 and the MEC server instance 510. The fingerprint may be identified based upon a source port and source IP address used by the application 504 and a destination port and destination IP address of the MEC server instance 510. In some embodiments, the component 501 may define the traffic flow 520 as an IP flow defined by a tuple as the fingerprint. The tuple may comprise a device IP identifier, a MEC IP identifier, a source port number, and a destination port number. In this way, the component 501 can distinguish between data packets that belong to the traffic flow 520 of the application 504 and data packets of other traffic flows.

During operation 404 of method 400, the fingerprint may be utilized to track the traffic flow 520 between the application 504 and the MEC server instance 510 in order to measure round trip time latencies of the traffic flow 520 during runtime of the application 504. A round trip time latency may correspond to a timespan from when a request is transmitted by the application 504 over the communication network to when a response from the MEC server instance 510 is received by the application 504. The round trip time latencies may be compared to the latency management policy 518 to determine whether the latency management policy 518 has been violated. For example, the latency management policy 518 is violated if the round trip time latencies indicate that the application 504 experience a latency over 30 ms for more than 2 seconds.

During operation 406 of method 400, in response to the comparison indicating that the latency management policy 518 has been violated, segment latencies along segments of a communication travel path of the traffic flow 520 from the device 502 to the first MEC platform 508 may be measured. In an example, the segment latencies may be measured in near-real-time such as during a timespan during which the latency management policy 518 was violated. In an example, the communication travel path may correspond to segments between the device 502, the first network communication component 512, the second network communication component 514, the third network communication component 516, and the first MEC platform 508. In some embodiments, time series data may be generated for a plurality of time periods based upon the segment latencies. For a first time period, the time series data may comprise a first round trip time latency measured during the first time period and a set of segment latencies measured along the segments of the traffic flow 520 during the first time period. For a second time period, the time series data may comprise a second round trip time latency measured during the second time period and a set of segment latencies measured along the segments of the traffic flow 520 during the second time period.

In some embodiments of measuring the segment latencies, a digital plane may be dynamically constructed (e.g., during runtime of the application 504 and/or in near-real-time to the violation) for a plurality of traffic flows from the device 502 in order to identify hops (network communication components) along communication travel paths of the traffic flows. For example, the digital plane may identify the first network communication component 512, the second network communication component 514, the third network communication component 516, and/or other network communication components that are part of the communication travel paths of the traffic flows of the device 502. In some embodiments, the digital plane may be composed of data that represents a digital twin, such as a dynamic digital twin of a traffic flow (e.g., an IP flow) at a point in time. The digital plane may be evaluated to identify the segments of the communication travel path for the traffic flow 520 based upon the hops. In this way, the segments may be identified and the segment latencies may be measured.

In some embodiments of measuring the segment latencies, a topology data store may be evaluated using a location of the device 502 in order to identify the first network communication component 512 as a first hop along the communication travel path of the traffic flow 520. The first network communication component 512 may be queried to identify a second hop along the communication travel path. For example, a routing table of a router (e.g., an IP forwarder) of the first network communication component 512 may be queried to identify the second network communication component 514 as the second hop. The second network communication component 514 may be queried to identify a third hop along the communication travel path. For example, a routing table of a router of the second network communication component 514 may be queried to identify the third network communication component 516 as the third hop. In this way, the communication travel path may be constructed based upon the hops. Segments between the hops may be identified as the segments of the traffic flow 520 for measuring the segment latencies.

The segment latencies may be evaluated to determine whether any of the segment latencies exceeds a threshold. In an example, a segment latency of a segment may exceed the threshold if the segment latency is an outlier compared to other segment latencies of other segments. In an example, a segment latency of a segment may exceed the threshold if the segment latency is greater than an expected segment latency. In an example, a segment latency of a segment may exceed the threshold if the segment latency has increased by a threshold amount compared to prior segment latencies of the segment. A segment whose segment latency exceeds the threshold may be a causation factor for a latency issue that caused the violation of the latency management policy 518 of the application 504.

During operation 408 of method 400, a management resolution function may be performed based upon one or more of the segment latencies exceeding the threshold. In an example, the time series data may be used to determine what management resolution function to perform (e.g., the time series data may be indicative of problematic segments to avoid). A variety of management resolution functions may be performed. In some embodiments of implementing the management resolution function, the MEC server instance 510 at the first MEC platform 508 may be migrated 542 to a second MEC platform 540 as a migrated MEC server instance 544, as illustrated by FIG. 5B. The second MEC platform 540 may provide lower latency processing and/or segments along a path to the second MEC platform 540 may have lower segment latencies than one or more of the segments of the path to the first MEC platform 508.

Figure 6:
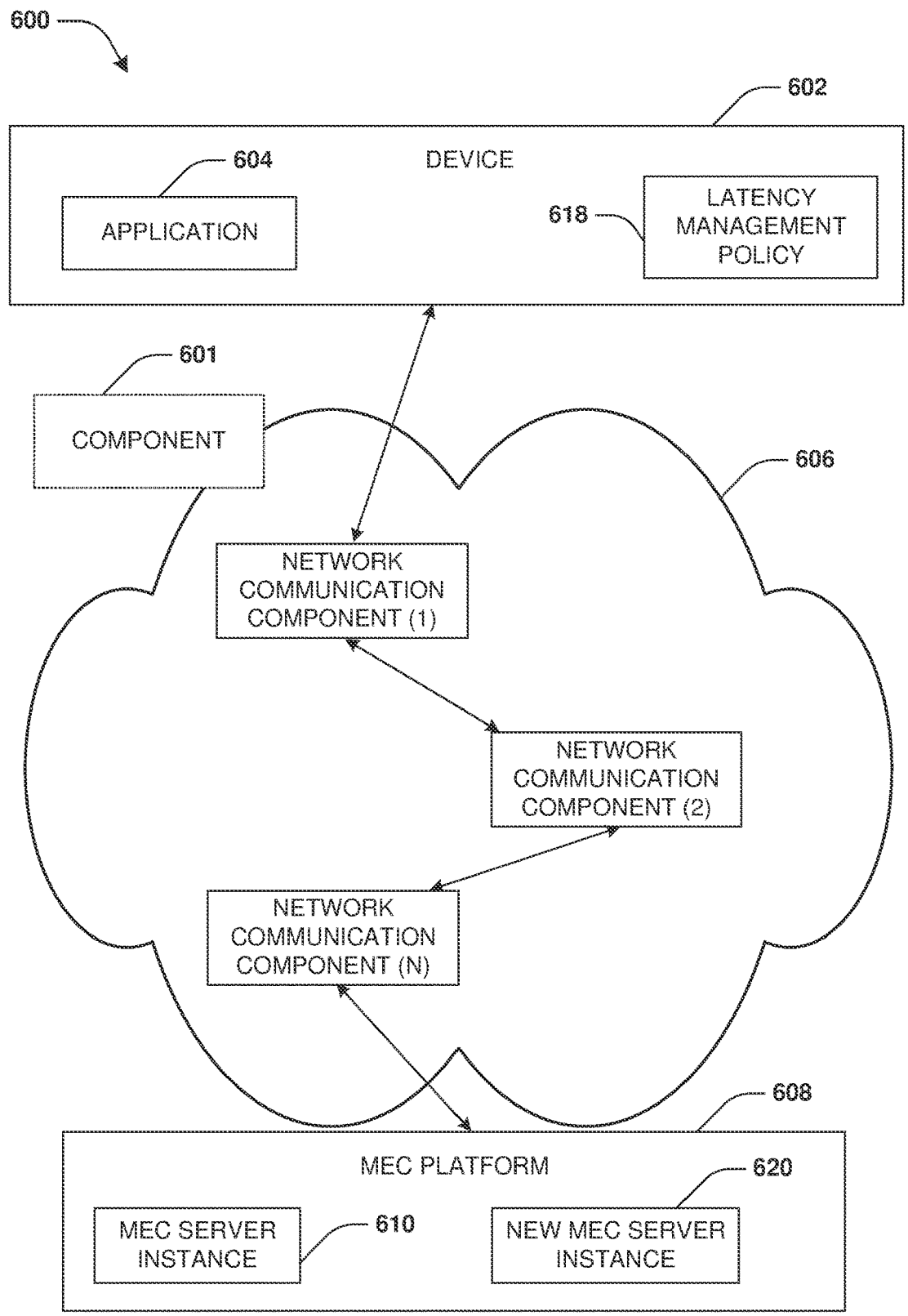
FIG. 6 is a diagram illustrating an example scenario for latency evaluation and management resolution, where a management resolution is performed.

FIG. 6 illustrates an embodiment of implementing a management resolution function in order to resolve a latency issue violating a latency management policy 618 of an application 604 executing on a device 602 connected to a communication network 606 for accessing a MEC server instance 610 on a MEC platform 608. As part of implementing the management resolution function, a new MEC server instance 620 may be created at the MEC platform 608 or at a different MEC platform 608 by a component 601. In this way, subsequent traffic flow of the application 604 may be routed to the new MEC server instance 620.

Figure 7:
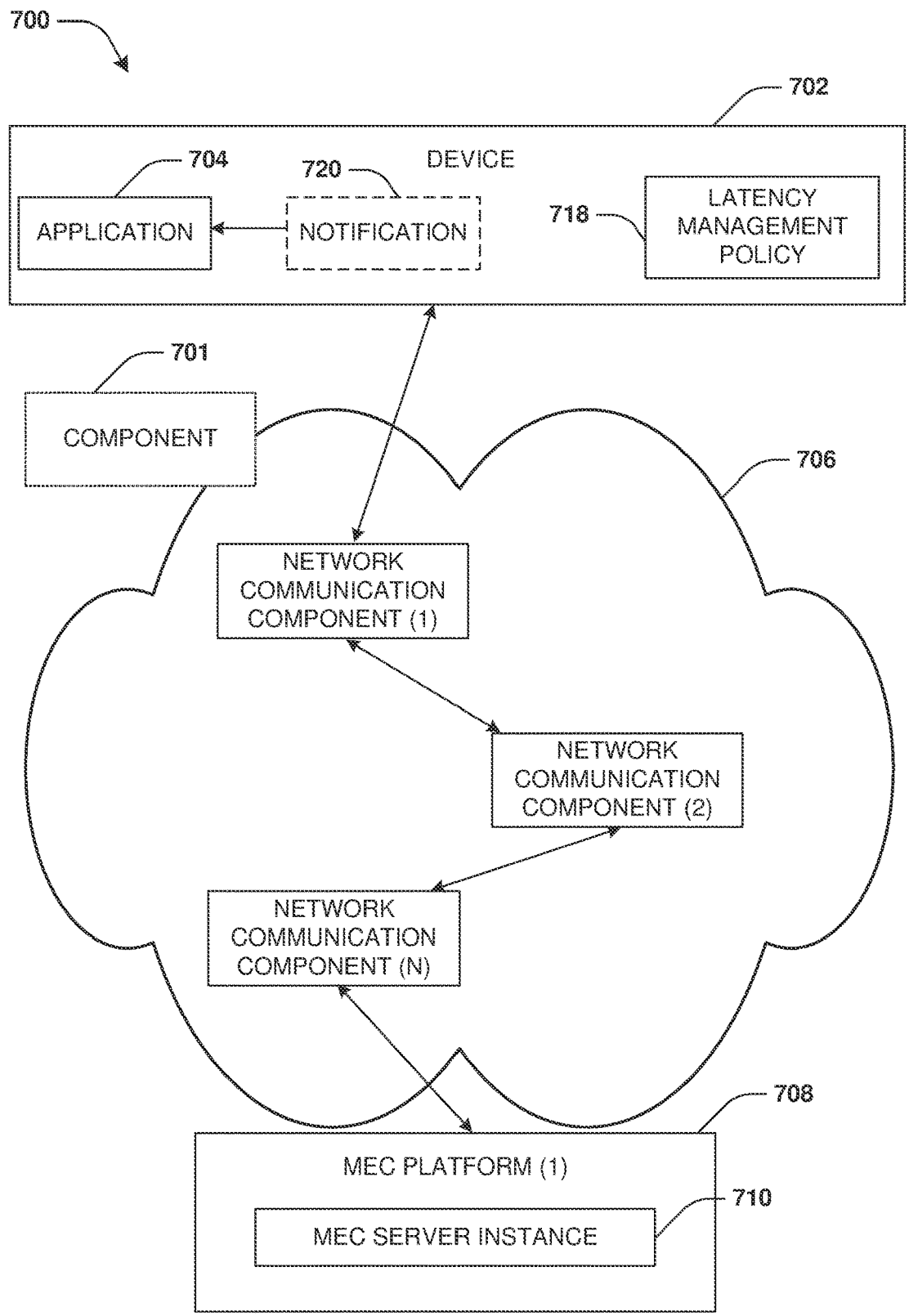
FIG. 7 is a diagram illustrating an example scenario for latency evaluation and management resolution, where a management resolution is performed.

FIG. 7 illustrates an embodiment of implementing a management resolution function in order to resolve a latency issue violating a latency management policy 718 of an application 704 executing on a device 702 connected to a communication network 706 for accessing a MEC server instance 710 on a MEC platform 708. As part of implementing the management resolution function, a notification 720 may be transmitted by a component 701 to the application 704 to cause the application to perform an operation such as a throttling operation to slow down operation of the application so that the application may continue to operate even under the constraints of a higher latency causing the violation.

Once the management resolution function is performed, a reactive diagnostic latency test may be performed. The reactive diagnostic latency test is performed in order to determine whether the management resolution function resolved the violation. For example, the reactive diagnostic latency test may measure a current round trip time latency to see if the current round trip time latency violates a latency management policy or not.

According to some embodiments, a method is provided. The method includes identifying a fingerprint for traffic flow over a communication network from an application executing on a device to a multi-access edge (MEC) server instance hosted by a MEC platform, wherein the fingerprint is identified based upon a source port and source IP address used by the application and a destination port and destination IP address of the MEC server instance; utilizing the fingerprint to track the traffic flow between the application and the MEC server instance during runtime of the application for measuring round trip time latencies of the traffic flow; in response to a round trip time latency violating a latency management policy during a timespan, measuring segment latencies along segments of a communication travel path of the traffic flow from the device to the MEC platform during the timespan; and performing a management resolution function based upon one or more of the segment latencies exceeding a threshold.

According to some embodiments, the method includes moving the hosting of the MEC server instance from the MEC platform to a different MEC platform.

According to some embodiments, the method includes creating a new MEC server instance; and routing subsequent traffic flow to the new MEC server instance.

According to some embodiments, the method includes transmitting a notification to the MEC application to cause the MEC application to throttle operation of the MEC application.

According to some embodiments, the method includes transmitting synthetic traffic between the device and the MEC platform to measure synthetic traffic round trip time latencies; comparing the synthetic traffic round trip time latencies to latency management policies of applications to onboard; and in response to determining that at least one latency management policy would be violated, performing a preemptive management resolution function.

According to some embodiments, the method includes implementing the preemptive management resolution function during onboarding of a corresponding application before runtime.

According to some embodiments, the method includes transmitting a control packet from a software stack of the device to a reflector component hosted by the MEC platform.

According to some embodiments, the method includes transmitting synthetic traffic between the device and the MEC platform to measure synthetic traffic round trip time latencies; and in response to a synthetic traffic round trip time latency violating the latency management policy, performing the management resolution function during runtime of the application.

According to some embodiments, the method includes dynamically constructing a digital plane for a plurality of traffic flows from the device to identify hops along communication travel paths of the traffic flows; and evaluating the digital plane to identify the segments of the communication travel path for the traffic flow based upon the hops.

According to some embodiments, the method includes evaluating a topology data store using a location of the device to identify a network communication component as a first hop along the communication travel path of the traffic flow; querying the network communication component to identify a second hop along the communication travel path; constructing the communication travel path based upon the first hop and the second hop; and identifying the segments based upon hops along the communication travel path.

According to some embodiments, the method includes querying a routing table of a router of the network communication component to identify the second hop as a next hop within the communication network.

According to some embodiments, the method includes generating time series data for a plurality of time periods, wherein for a first time period, the time series data comprises a first round trip time latency measured during the first time period and a set of segment latencies measured during the first time period; and evaluating the time series data to determine whether to perform one or more management resolution functions.

According to some embodiments, the method includes performing a reactive diagnostic latency test to determine if performance of the management resolution function resolved the violation.

According to some embodiments, a system is provided. The system comprises a processor coupled to memory, the processor configured to execute instructions to perform operations. The operations includes transmitting synthetic traffic between a device and a multi-access edge (MEC) platform hosting a MEC server instance to measure synthetic traffic round trip time latencies; comparing the synthetic traffic round trip time latencies to a latency management policy of an application to onboard for execution on the device for accessing the MEC server instance; and in response to determining that a synthetic traffic round trip time latency would violate the latency management policy, performing a preemptive management resolution function.

According to some embodiments, the operations include transmitting a control packet from a software stack of the device to a reflector component hosted by the MEC platform for measuring the synthetic traffic round trip time latency.

According to some embodiments, the operations include comparing the synthetic traffic round trip time latencies to a first latency management policy of a first application during runtime of the first application executing on the device; and in response to determining that the synthetic traffic round trip time latency would violate the first latency management policy, performing a management resolution function.

According to some embodiments, the operations include during runtime of a first application executing on the device, utilizing a fingerprint to track traffic flow between the first application and the MEC server instance for measuring round trip time latencies of the traffic flow; in response to a round trip time latency violating a first latency management policy of the first application, measuring segment latencies along segments of a communication travel path of the traffic flow from the device to the MEC platform; and performing a management resolution function based upon one or more of the segment latencies exceeding a threshold.

According to some embodiments, a non-transitory computer-readable medium storing instructions that when executed facilitate performance of operations, is provided. The operations include identifying a fingerprint for traffic flow over a communication network from an application executing on a device to a multi-access edge (MEC) server instance hosted by a MEC platform, wherein the fingerprint is identified based upon source communication information used by the application and destination communication information of the MEC server instance; during runtime of the application, utilizing the fingerprint to track the traffic flow between the application and the MEC server instance for measuring round trip time latencies of the traffic flow; in response to a round trip time latency violating a latency management policy, measuring segment latencies along segments of a communication travel path of the traffic flow from the device to the MEC platform; and performing a management resolution function based upon a segment latency exceeding a threshold.

According to some embodiments, the operations include defining the traffic flow as an IP flow defined by a tuple comprising a device IP identifier, a MEC IP identifier, a source port number, and a destination port number.

According to some embodiments, the operations include performing the management resolution function to move the hosting of the MEC server instance from the MEC platform to a different MEC platform.

Figure 8:
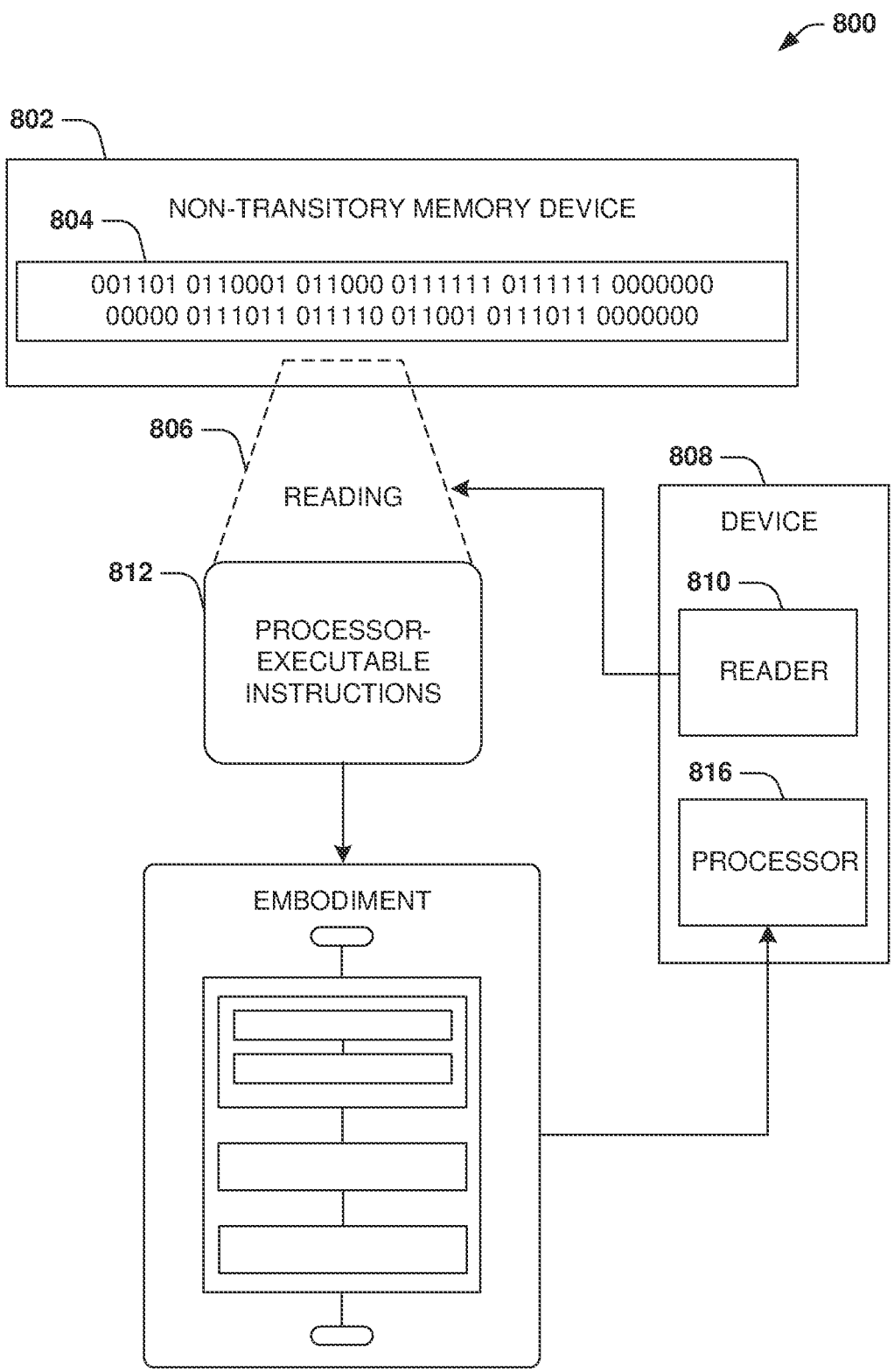
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 200 of FIG. 2 and/or at least some of the example method 400 of FIG. 4, for example. In some embodiments, the processor-executable instructions 812 are configured to cause implementation of a system, such as at least some of the example system 100 of FIG. 1, at least some of the example system 300 of FIG. 3, at least some of the example system 500 of FIGS. 5A and 5B, at least some of the example system 600 of FIG. 6, and/or at least some of the example system 700 of FIG. 7, for example.

Figure 9:
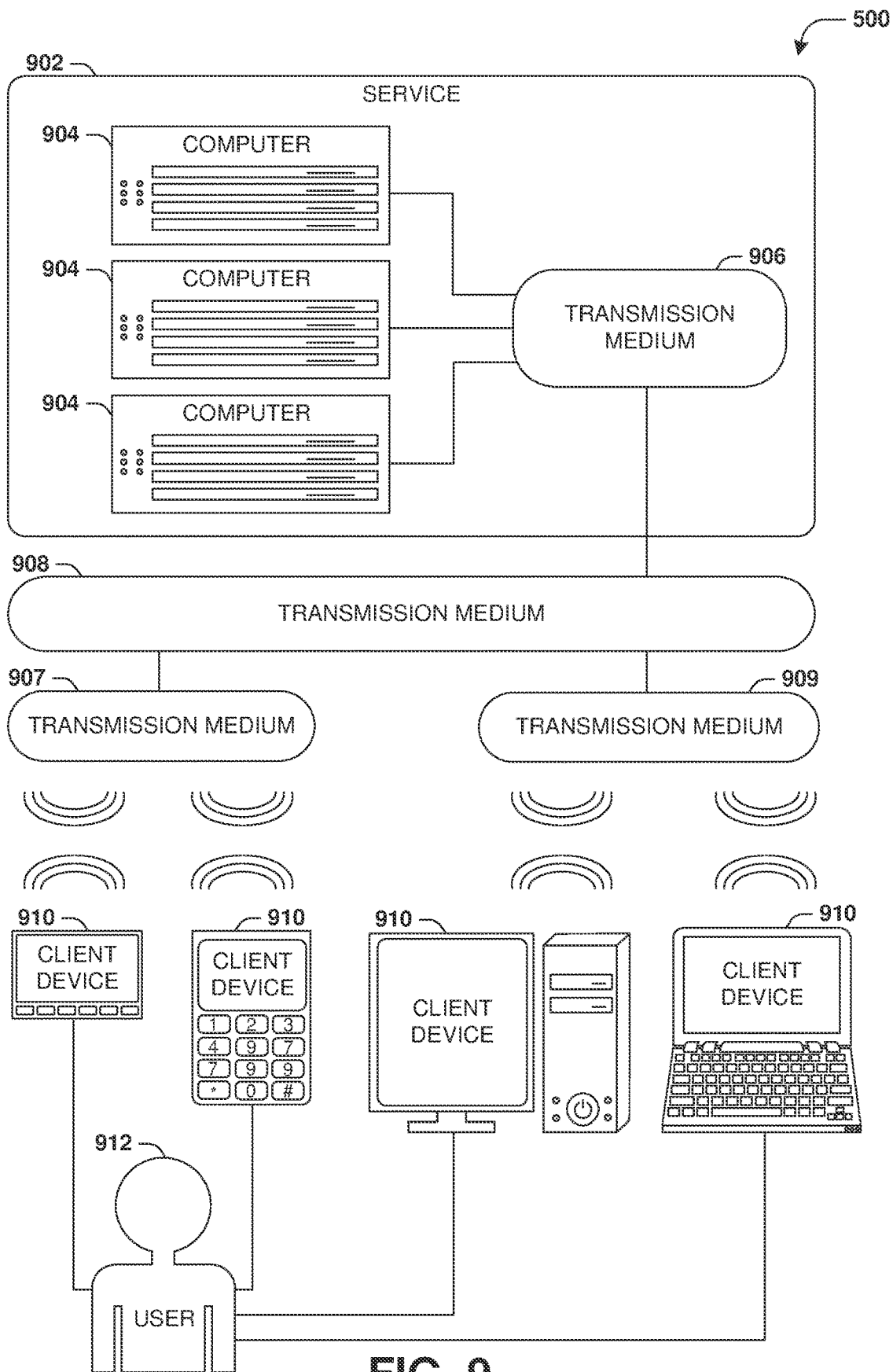
FIG. 9 is an illustration of example networks that may utilize and/or implement at least a portion of the techniques presented herein.

FIG. 9 is an interaction diagram of a scenario 900 illustrating a service 902 provided by a set of computers 904 to a set of client devices 910 via various types of transmission mediums. The computers 904 and/or client devices 910 may be capable of transmitting, receiving, processing, and/or storing many types of signals, such as in memory as physical memory states.

The computers 904 of the service 902 may be communicatively coupled together, such as for exchange of communications using a transmission medium 906. The transmission medium 906 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 902.

Likewise, the transmission medium 906 may comprise one or more sub-networks, such as may employ different architectures, may be compliant or compatible with differing protocols and/or may interoperate within the transmission medium 906. Additionally, various types of transmission medium 906 may be interconnected (e.g., a router may provide a link between otherwise separate and independent transmission medium 906).

In scenario 900 of FIG. 9, the transmission medium 906 of the service 902 is connected to a transmission medium 908 that allows the service 902 to exchange data with other services 902 and/or client devices 910. The transmission medium 908 may encompass various combinations of devices with varying levels of distribution and exposure, such as a public wide-area network and/or a private network (e.g., a virtual private network (VPN) of a distributed enterprise).

In the scenario 900 of FIG. 9, the service 902 may be accessed via the transmission medium 908 by a user 912 of one or more client devices 910, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 910 may communicate with the service 902 via various communicative couplings to the transmission medium 908. As a first such example, one or more client devices 910 may comprise a cellular communicator and may communicate with the service 902 by connecting to the transmission medium 908 via a transmission medium 907 provided by a cellular provider. As a second such example, one or more client devices 910 may communicate with the service 902 by connecting to the transmission medium 908 via a transmission medium 909 provided by a location such as the user's home or workplace (e.g., a WiFi (Institute of Electrical and Electronics Engineers (IEEE) Standard 902.11) network or a Bluetooth (IEEE Standard 902.15.1) personal area network). In this manner, the computers 904 and the client devices 910 may communicate over various types of transmission mediums.

Figure 10:
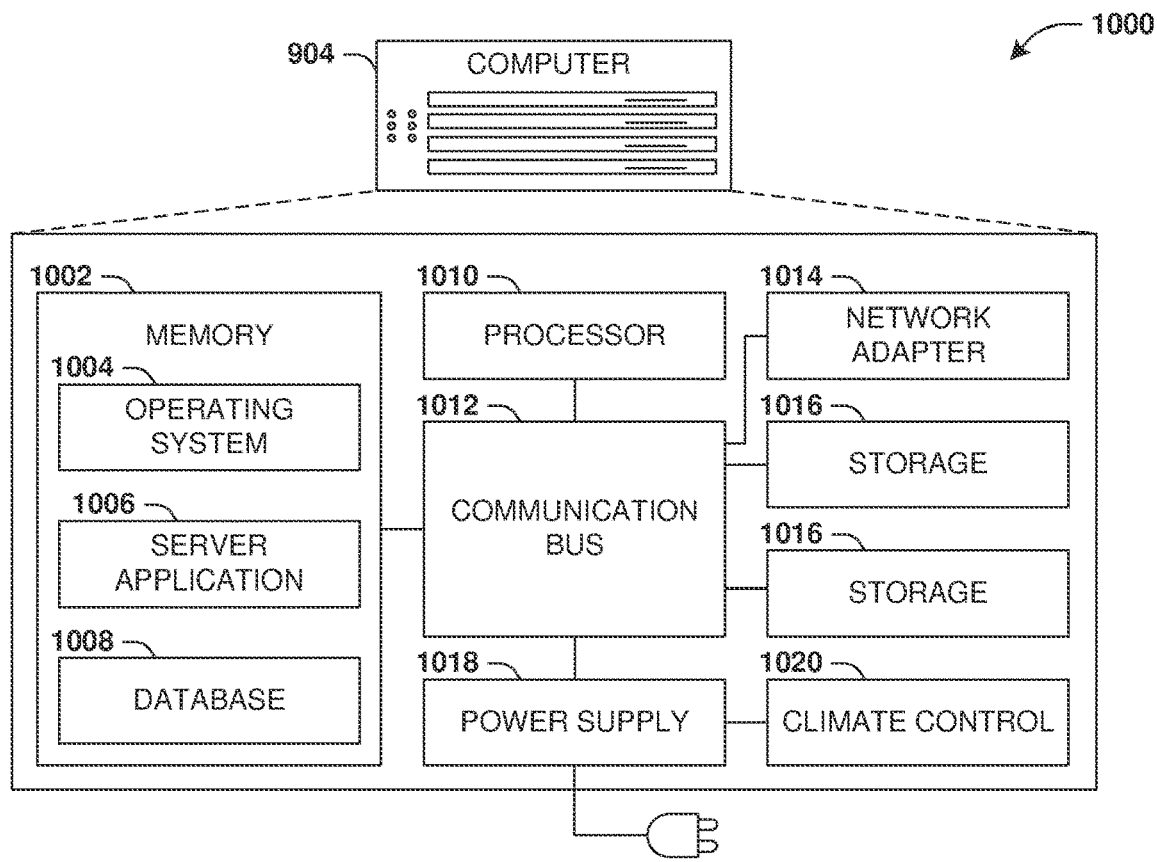
FIG. 10 is an illustration of a scenario involving an example configuration of a computer that may utilize and/or implement at least a portion of the techniques presented herein.

FIG. 10 presents a schematic architecture diagram 1000 of a computer 904 that may utilize at least a portion of the techniques provided herein. Such a computer 904 may vary widely in configuration or capabilities, alone or in conjunction with other computers, in order to provide a service such as the service 902.

The computer 904 may comprise one or more processors 1010 that process instructions. The one or more processors 1010 may optionally include a plurality of cores; one or more coprocessors, such as a mathematics coprocessor or an integrated graphical processing unit (GPU); and/or one or more layers of local cache memory. The computer 904 may comprise memory 1002 storing various forms of applications, such as an operating system 1004; one or more computer applications 1006; and/or various forms of data, such as a database 1008 or a file system. The computer 904 may comprise a variety of peripheral components, such as a wired and/or wireless network adapter 1014 connectible to a local area network and/or wide area network; one or more storage components 1016, such as a hard disk drive, a solid-state storage device (SSD), a flash memory device, and/or a magnetic and/or optical disk reader.

The computer 904 may comprise a mainboard featuring one or more communication buses 1012 that interconnect the processor 1010, the memory 1002, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 1012 may interconnect the computer 904 with at least one other computer. Other components that may optionally be included with the computer 904 (though not shown in the schematic architecture diagram 1000 of FIG. 10) include a display; a display adapter, such as a graphical processing unit (GPU); input peripherals, such as a keyboard and/or mouse; and a flash memory device that may store a basic input/output system (BIOS) routine that facilitates booting the computer 904 to a state of readiness.

The computer 904 may operate in various physical enclosures, such as a desktop or tower, and/or may be integrated with a display as an "all-in-one" device. The computer 904 may be mounted horizontally and/or in a cabinet or rack, and/or may simply comprise an interconnected set of components. The computer 904 may comprise a dedicated and/or shared power supply 1018 that supplies and/or regulates power for the other components. The computer 904 may provide power to and/or receive power from another computer and/or other devices. The computer 904 may comprise a shared and/or dedicated climate control unit 1020 that regulates climate properties, such as temperature, humidity, and/or airflow. Many such computers 904 may be configured and/or adapted to utilize at least a portion of the techniques presented herein.

Figure 11:
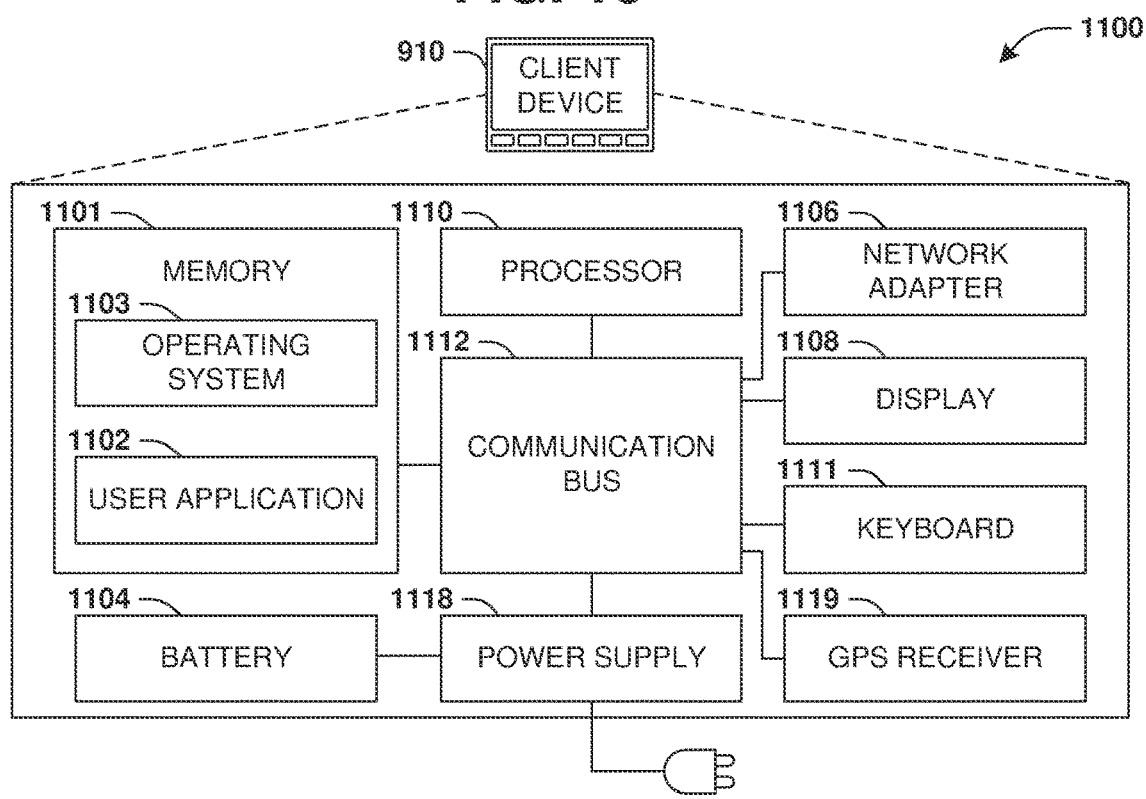
FIG. 11 is an illustration of a scenario involving an example configuration of a client that may utilize and/or implement at least a portion of the techniques presented herein.

FIG. 11 presents a schematic architecture diagram 1100 of a client device 910 whereupon at least a portion of the techniques presented herein may be implemented. Such a client device 910 may vary widely in configuration or capabilities, in order to provide a variety of functionality to a user such as the user 912. The client device 910 may be provided in a variety of form factors, such as a desktop or tower workstation; an "all-in-one" device integrated with a display 1108; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 910 may serve the user in a variety of roles, such as a workstation, kiosk, media player, gaming device, and/or appliance.

The client device 910 may comprise one or more processors 1110 that process instructions. The one or more processors 1110 may optionally include a plurality of cores; one or more coprocessors, such as a mathematics coprocessor or an integrated graphical processing unit (GPU); and/or one or more layers of local cache memory. The client device 910 may comprise memory 1101 storing various forms of applications, such as an operating system 1103; one or more user applications 1102, such as document applications, media applications, file and/or data access applications, communication applications such as web browsers and/or email clients, utilities, and/or games; and/or drivers for various peripherals. The client device 910 may comprise a variety of peripheral components, such as a wired and/or wireless network adapter 1106 connectible to a local area network and/or wide area network; one or more output components, such as a display 1108 coupled with a display adapter (optionally including a graphical processing unit (GPU)), a sound adapter coupled with a speaker, and/or a printer; input devices for receiving input from the user, such as a keyboard 1111, a mouse, a microphone, a camera, and/or a touch-sensitive component of the display 1108; and/or environmental sensors, such as a global positioning system (GPS) receiver 1119 that detects the location, velocity, and/or acceleration of the client device 910, a compass, accelerometer, and/or gyroscope that detects a physical orientation of the client device 910. Other components that may optionally be included with the client device 910 (though not shown in the schematic architecture diagram 1100 of FIG.

11) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 910 to a state of readiness; and a climate control unit that regulates climate properties, such as temperature, humidity, and airflow.

The client device 910 may comprise a mainboard featuring one or more communication buses 1112 that interconnect the processor 1110, the memory 1101, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 910 may comprise a dedicated and/or shared power supply 1118 that supplies and/or regulates power for other components, and/or a battery 1104 that stores power for use while the client device 910 is not connected to a power source via the power supply 1118. The client device 910 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In some embodiments, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   identifying a fingerprint for traffic flow over a communication network from an application executing on a device to a multi-access edge (MEC) server instance hosted by a MEC platform, wherein the fingerprint is identified based upon source communication information used by the application and destination communication information of the MEC server instance;
   utilizing the fingerprint to track the traffic flow between the application and the MEC server instance during runtime of the application for measuring round trip time latencies of the traffic flow;
   in response to a round trip time latency of the traffic flow from the device to the MEC platform violating a latency management policy during a timespan, measuring segment latencies along segments of a communication travel path of the traffic flow from the device to the MEC platform during the timespan;

performing a management resolution function based upon one or more of the segment latencies exceeding a threshold; and performing a reactive diagnostic latency test to determine if performance of the management resolution function resolved the violation.

2. The method of claim 1, wherein the performing the management resolution function comprises:

moving the hosting of the MEC server instance from the MEC platform to a different MEC platform.

3. The method of claim 1, wherein the performing the management resolution function comprises:

creating a new MEC server instance; and routing subsequent traffic flow to the new MEC server instance.

4. The method of claim 1, wherein the performing the management resolution function comprises:

transmitting a notification to the application to cause the application to throttle operation of the application.

5. The method of claim 1, comprising:

transmitting synthetic traffic between the device and the MEC platform to measure synthetic traffic round trip time latencies;

comparing the synthetic traffic round trip time latencies to latency management policies of applications to onboard; and in response to determining that at least one latency management policy would be violated, performing a preemptive management resolution function.

6. The method of claim 5, wherein the performing the preemptive management resolution function comprises:

implementing the preemptive management resolution function during onboarding of a corresponding application before runtime.

7. The method of claim 5, wherein the transmitting synthetic traffic comprises:

transmitting a control packet from a software stack of the device to a reflector component hosted by the MEC platform.

8. The method of claim 1, comprising:

transmitting synthetic traffic between the device and the MEC platform to measure synthetic traffic round trip time latencies; and in response to a synthetic traffic round trip time latency violating the latency management policy, performing the management resolution function during runtime of the application.

9. A method comprising:

tracking traffic flow, over a communication network from an application executing on a device to a multi-access edge (MEC) server instance hosted by a MEC platform, during runtime of the application for measuring round trip time latencies of the traffic flow; and in response to a round trip time latency violating a latency management policy during a timespan, measuring segment latencies along segments of a communication travel path of the traffic flow from the device to the MEC platform during the timespan, where the measuring segment latencies comprises:

dynamically constructing a digital plane for a plurality of traffic flows from the device to identify hops along communication travel paths of the plurality of traffic flows; and evaluating the digital plane to identify the segments of the communication travel path for the traffic flow based upon the hops.

10. The method of claim 9, comprising:

identifying a fingerprint for the traffic flow based upon source communication information used by the application and destination communication information of the MEC server instance, wherein the tracking the traffic flow is performed utilizing the fingerprint; and performing a management resolution function based upon one or more of the segment latencies exceeding a threshold.

11. A method comprising:

tracking traffic flow, over a communication network from an application executing on a device to a multi-access edge (MEC) server instance hosted by a MEC platform, during runtime of the application for measuring round trip time latencies of the traffic flow; and in response to a round trip time latency violating a latency management policy during a timespan, measuring segment latencies along segments of a communication travel path of the traffic flow from the device to the MEC platform during the timespan, where the measuring segment latencies comprises:

evaluating a topology data store using a location of the device to identify a network communication component as a first hop along the communication travel path of the traffic flow;

querying the network communication component to identify a second hop along the communication travel path;

constructing the communication travel path based upon the first hop and the second hop; and identifying the segments based upon hops along the communication travel path.

12. The method of claim 11, wherein the querying comprises:

querying a routing table of a router of the network communication component to identify the second hop as a next hop within the communication network.

13. The method of claim 11, comprising:

identifying a fingerprint for the traffic flow based upon source communication information used by the application and destination communication information of the MEC server instance, wherein the tracking the traffic flow is performed utilizing the fingerprint; and performing a management resolution function based upon one or more of the segment latencies exceeding a threshold.

14. A method comprising:

tracking traffic flow, over a communication network from an application executing on a device to a multi-access edge (MEC) server instance hosted by a MEC platform, during runtime of the application for measuring round trip time latencies of the traffic flow;

in response to a round trip time latency violating a latency management policy during a timespan, measuring segment latencies along segments of a communication travel path of the traffic flow from the device to the MEC platform during the timespan;

generating time series data for a plurality of time periods, wherein for a first time period, the time series data comprises a first round trip time latency measured during the first time period and a set of segment latencies measured during the first time period; and evaluating the time series data to determine whether to perform one or more management resolution functions.

15. The method of claim 14, comprising:
identifying a fingerprint for the traffic flow based upon source communication information used by the application and destination communication information of the MEC server instance, wherein the tracking the traffic flow is performed utilizing the fingerprint; and
performing a management resolution function based upon one or more of the segment latencies exceeding a threshold.

16. A system comprising:
a memory comprising instructions; and
a processor coupled to the memory, the processor configured to execute the instructions to facilitate performance of operations comprising:
transmitting synthetic traffic between a device and a multi-access edge (MEC) platform hosting a MEC server instance to measure synthetic traffic round trip time latencies;
comparing the synthetic traffic round trip time latencies to a latency management policy of an application to onboard for execution on the device for accessing the MEC server instance; and
in response to determining that a synthetic traffic round trip time latency would violate the latency management policy, performing a preemptive management resolution function.

17. The system of claim 16, the operations comprising:
transmitting a control packet from a software stack of the device to a reflector component hosted by the MEC platform for measuring the synthetic traffic round trip time latency.

18. The system of claim 16, the operations comprising:
comparing the synthetic traffic round trip time latencies to a first latency management policy of a first application during runtime of the first application executing on the device; and
in response to determining that the synthetic traffic round trip time latency would violate the first latency management policy, performing a management resolution function.

19. The system of claim 16, the operations comprising:
during runtime of a first application executing on the device, utilizing a fingerprint to track traffic flow between the first application and the MEC server instance for measuring round trip time latencies of the traffic flow;
in response to a round trip time latency violating a first latency management policy of the first application, measuring segment latencies along segments of a communication travel path of the traffic flow from the device to the MEC platform; and
performing a management resolution function based upon one or more of the segment latencies exceeding a threshold.

20. The system of claim 16, the operations comprising:
performing a management resolution function based upon at least one of the synthetic traffic round trip time latencies or round trip time latency of traffic flow between a first application and the MEC server instance.

* * * * *